Patented May 10, 1927.

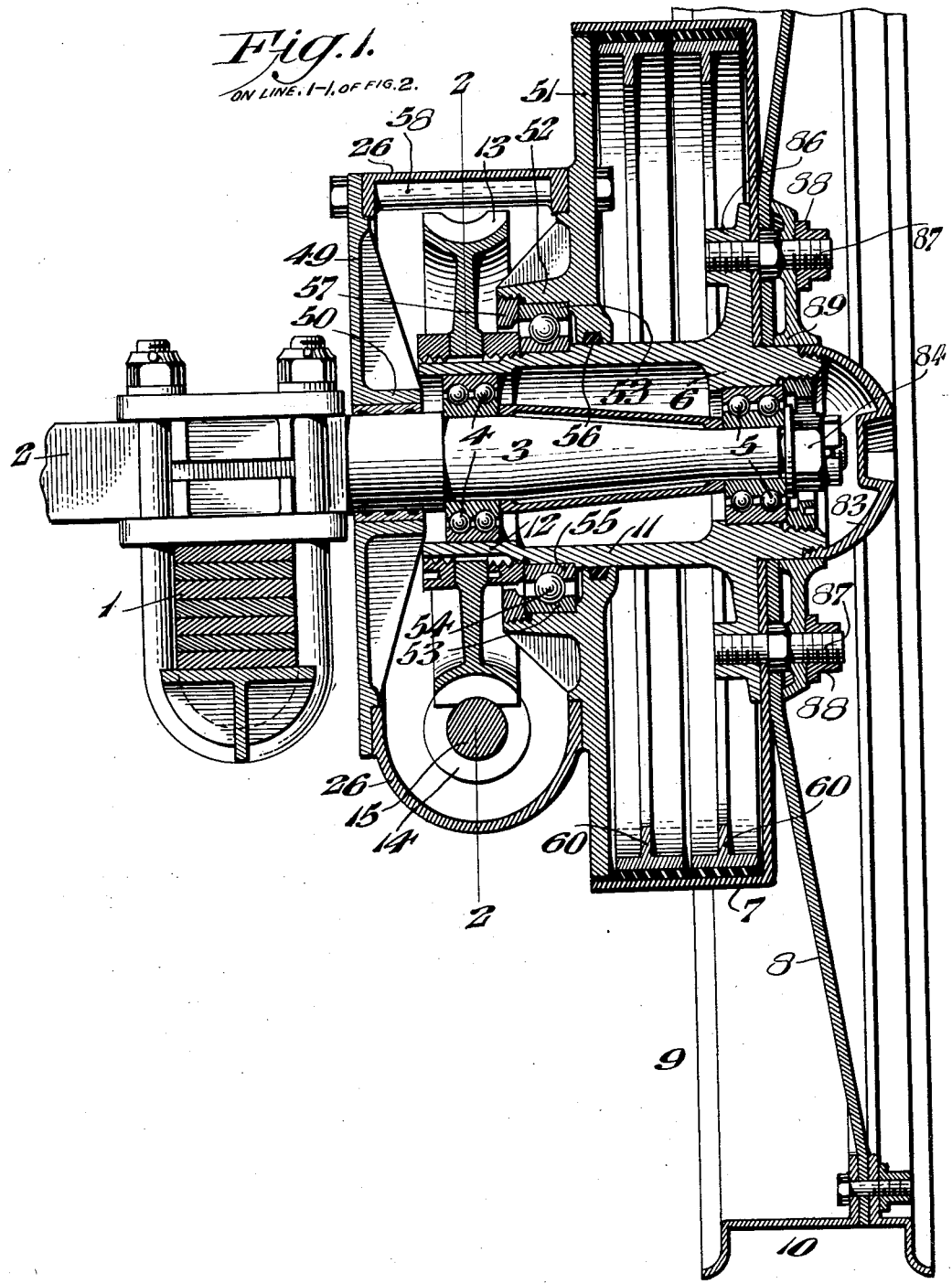

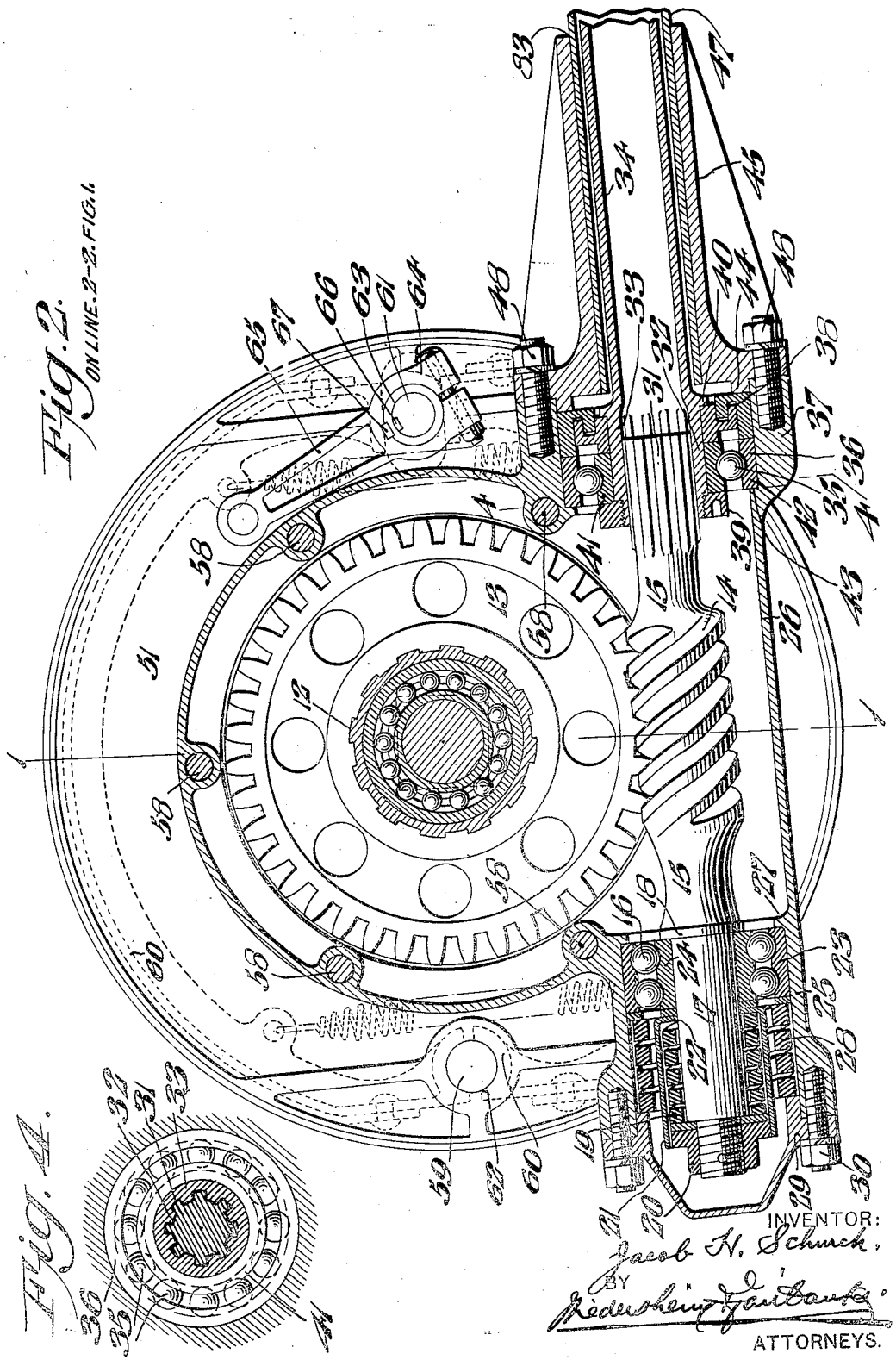

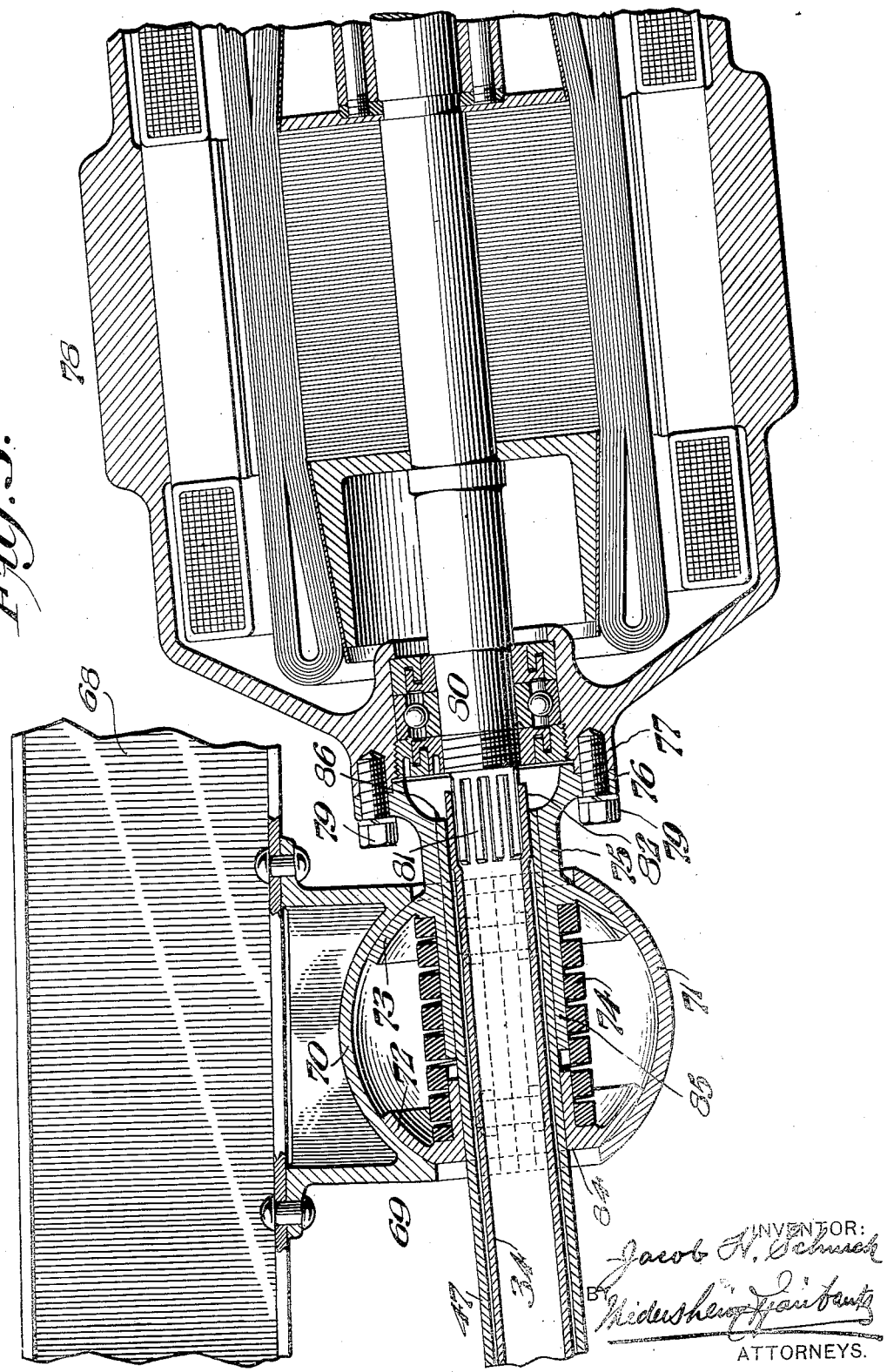

1,627,712

UNITED STATES PATENT OFFICE.

JACOB H. SCHURCH, OF PHILADELPHIA, PENNSYLVANIA, ASSIGNOR OF ONE-HALF TO WILLIAM H. HEISE, OF LOS ANGELES, CALIFORNIA.

POWER TRANSMISSION FOR VEHICLES.

Application filed December 10, 1923. Serial No. 679,647.

My invention relates to propelled vehicles such as automobiles, trucks, tractors, rail cars, trackless trolley cars etc. In all of these cases, a low center of gravity is very desirable from the standpoints of safety, facility of loading and easy access for the passenger.

The conventional forms of power transmission devices are detrimental to a low center of gravity on account of the space required for the gears (spur, bevel, and worm), differential and propeller shafts on automobiles, trucks, buses and tractors which are mostly located in or near the center line of the vehicle, with chain drives on account of the counter shaft bearing the differential and the transmission gears, and on rail cars, trackless trolley and other electrically driven vehicles on account of the motors, which usually require all the space available between the driving wheels. The same applies to steam and hydraulic driven vehicles, where the machinery is also located under the space provided for the load. In all these cases, the height of the platform from the ground is fixed by the space required for the different transmission and driving elements, and the ideal conditions of a low center of gravity, facility of loading and easy access for passenger and last not least for repair must necessarily be sacrificed for reasons of construction. To overcome these inherently bad features of the conventional form of power transmission is the object of my invention. For this purpose each driven wheel has its individual motor, transmission and couple gear, located close to the path of the wheel, in such a way not to interfere with the space required for the load carrying platform, thus permitting me to arrange the latter as low as road conditions will allow. Ordinarily the power transmission will be located on the inner side of the wheel, but in special cases, the transmission may be also located on the outer side of the wheel to provide maximum space for the load carrying platform.

A further object of my invention is to provide a transmission, which is easily accessible, without the use of a pit, and which may be removed easily from the side, without interfering with the suspension springs, the fenders, aprons, body, stepboard etc., in other words a transmission which may be removed and inspected on the road, without requiring special facilities, and tools.

A further object of my invention is to provide a silent, highly efficient and flexible transmission, requiring as little as possible attention from the standpoint of lubrication.

A further object of my invention is to avoid any torque transmission through the axle and springs, but to utilize the transmission for torque and tie rod, thus giving the vehicle an easy riding quality and higher safety.

A further object of my invention is to make the brakes easily accessible, by providing that not only the disc wheel as customary but also the brake drums may be removed from the outer side of the vehicle.

A further object of my invention is to make the load supporting axle stationary, thus permitting me to fasten the suspension springs to the axle and give the axle any shape and form, which may be necessary for low arrangement of the load carrying platform. This is also greatly facilitated by the fact that no torque is transmitted through the axle, which is only subject to load and push.

A further object of my invention is to provide that the torque of the brakes is taken up by the transmission, thus eliminating any torque through the axle and suspension springs.

A further object of my invention is to reduce the number of parts to a minimum by combining the transmission and brakes to one unit, which may be easily replaced by a reserve unit, without disturbing any other constructive part of the vehicle.

A further object of my invention is to provide that the weight of the transmission connected with the unsprung axle is full or at least to the greatest part balanced through the weight of the free hanging motor thus relieving the axle practically of the transmission weight and reducing the unsprung weight to the minimum possible. Through this balanced condition the riding qualities of the vehicle are ideal and the wear and tear of the tires are greatly reduced. The motor being free hanging or suspended on the sprung frame, body or cross member is relieved of all undue strains.

A further object of my invention is to provide against shocks caused by obstructions in front of the driving wheel transmitted through the transmission, which acts as a tie rod, by a spring joint on frame, body or cross member.

It further consists of other novel features of construction and advantage, all as will be hereinafter fully described and pointed out in the claims.

For the purpose of illustrating my invention, I have shown in the accompanying drawings forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a vertical section of my novel transmission for vehicles embodying my invention the section being taken on line 1—1, Figure 2.

Figure 2 represents a vertical section on line 2—2, Figure 1.

Figure 3 represents a longitudinal sectional view of the front of the propeller shaft, its housing and connections to the sprung part of the vehicle.

Figure 4 represents a section of the male and female spline, the section being taken on line 4—4, Figure 2.

Similar numerals of reference indicate corresponding parts.

Referring to the drawings:—

In carrying out my invention, I support on the axle 2, the spring 1, having the outer extension 3, which carries the inner and outer ball bearings 4 and 5, upon which is mounted the hub 6, to which is attached the brake drum 7 and the web 8 of the wheel 9, which is shown in this case as having a rim for a straight side tire. 11 designates an inward extension of the hub 6, which terminates in the spline 12, on which is mounted the worm gear 13, which is in mesh with the worm 14 which forms a part of the shaft 15. On the outer end of the shaft 15 is the ball bearing 16, the inner ball race 24 of which, has a sliding fit on the portion 17, and is pressed against the shoulder 18, by the tension of the spring 19, which is compressed by the nut 20. The shell 21 surrounds the spring 19, which latter presses against the shell bottom 22. The purpose of the shell 21 is to safeguard the spring from falling apart, if breakage occurs, and so maintain the spring sections in assembled condition, so that they will function in case of breakage. The outer race 23 has a sliding fit in the extension 25 of the housing 26 and is pressed against the shoulder 27 by the tension of the outer spring 28, which is compressed by its contact with the inner end of the cap 29, which is held in position by any suitable fastening devices 30. The inner end of the worm shaft 15 has a male spline 31 thereon, which has a sliding fit within a corresponding female spline 32, of the extension 33 of the tubular propeller shaft 34. Upon the outer portion of the extension 33 is mounted the ball bearing 35 having the ball race located in the inner extension 37 of the housing 26. The inner race 41 of the ball bearing 35 is held against the inner portion of the labyrinth seal 38, by the nut 39, which presses said inner portion against the shoulder 40 of the tubular shaft 34. The outer race 42 of the ball bearing 35 is contained between the shoulder 43 of the housing 26, and the shoulder 44 of the bracket 45, which receives the inner end of the propeller housing 47, said bracket being secured to the housing 26 by any suitable means 48. The left hand end of the housing 26, as will be understood from Figure 1, is closed by the cover plate 49, whose central portion has a hub 50, which serves as a bearing for the housing 26. The right hand portion of the housing 26 is closed by the annular cover plate 51, whose central portion has the hub 52, containing the outer race 53 and the ball bearing 54, whose inner race 55 is mounted on the exterior of the extension 11 of the hub 6. The bearing 54 is sealed by a suitable packing 56 located, as will be understood from Figure 1. The outer race 53 of the ball bearing 54 is secured in position by the nut 57. The cover plates 49 and 51 are held in assembled position by the tie bolts 58. Referring to Figure 2, 59 designates the fulcrum pin for the brake shoes 60, which is supported by the hub 62, which latter is a part of the cover plate 51. The cam pins 61 and 63 are supported and turn freely in a similar hub 64, the latter being also a part of cover plate 51, said cam pins 61 and 63 being operated in any conventional way by the brake levers 65, which latter are keyed to the cam pins 61 and 63 by means of keyways 66 and 67.

It will be understood that Figure 3 is a continuation of Figure 2, and in said Figure 3, 68 designates a portion of the sprung body, frame, cross member or equivalent construction from which is supported the universal joint 69, composed of the outer hemispherical shells 70 and 71, within which are contained the inner shells 72 and 73. The inner portion of the shell 73 is mounted on the tubular propeller shaft housing 47. The surfaces of the inner shells 72 and 73 are in contact with the contiguous outer shells 70 and 71 by the spring 74. The extension 75 has a flange 76, which is secured to the hub 77 of the driving motor 78 by the bolts 79. The motor shaft 80 is coupled to the hollow propeller shaft 34 by means of the female spline 81 and the male spline 82, which are similar to the construction seen in Figures 2 and 4 and need not be described in greater detail, it being apparent that the motor shaft 80, the propeller shaft 34, and the worm shaft 15 are in longitudinal alignment and rotate as a unit, and will keep their alignment under all conditions of use. The motor shaft 80 is provided with suitable ball bearing and lubricating devices as is customary.

It will be understood that the motor 78 is freely suspended and that its weight helps to counterbalance the elements on the opposite side of the universal joint 69.

The operation is as follows:—

The motor drives its shaft 80, the propeller shaft 34, and the worm shaft 15, from which latter power is transmitted to the gear 13 which is splined to the extension 11 of the hub 6, so that said gear and hub rotate as a unit, and drive the wheel 9.

The motor is hung on the sprung part of the body 68, in order to eliminate as far as possible all strain caused by obstructions of the road, whereas the couple gear in this case, the worm wheel and worm is by necessity suspended on the unsprung axle of the vehicle there must be necessarily changes of the angular velocity between the wheel and the motor resulting from the action of the spring 1, which supports the body part 68 on the axle 2. Such sudden changes of the angular velocity are taken care of in my novel design by allowing the worm 15 to slide in axial direction to both sides of the section line 1, in Figure 2. The spring 28 pressing the outer race 23 against the shoulder 27 permits the worm 15 to slide to the left, while the spring 19 pressing the inner race 24 against the shoulder 18 permits said worm 15 to slide to the right. The right extension of the worm 15 being equipped with sliding spline 31 allows or permits the worm to move in both axial directions. These changes in angular velocity are taken care of and are not transmitted to the motor 78, in other words, the motor 78 is safeguarded against sudden changes of velocity caused by the spring action of the vehicle.

As already mentioned, the propeller shaft housing 47 serves at the same time, as a torque and tie rod. Strains caused at times when the wheel meets an obstruction in the road are taken care of by the compression spring 74 in the universal joint 69, through which the push and pull of the propeller shaft housing 47 is transmitted to the body 68, as sudden excessive pulls on the propeller shaft housing 47 compress the spring 74 through the inner shell 73 against the inner shell 72.

By this novel design of the universal joint breakages by sudden excessive strains are avoided or eliminated, as is evident.

Easy access for inspection or replacement of parts is provided for in this novel construction in such a way that by removal of the lower shell 71 of the universal joint 69, the motor and transmission as a unit may be dropped below the body, step-board, or running board, and then by removal of hub cap 83 and lock nut 84, the wheel transmission including the wheel 9 may be removed sideways to the outside, without interfering with the fenders, springs, running board, apron, etc., of the vehicle.

In order to simplify lubrication and to reduce necessary attention for lubrication to a minimum, all bearings connected with the wheel drive, as for instance, bearings 5, 4, 54, 35, and 16 are lubricated from one common oil basin formed within the lower portion of the worm housing 26.

In order to have easy access to the brakes, the brake 7 is mounted between the flange 86 of the hub 6 and the disc 8 of the wheel 9. The brake drum 7 is bolted to the flange 86 by means of suitable studs 87, and by removing the nuts 88, the annular pressure plate 89, and the web 8 of the disc or disc wheel 9 may be removed in a conventional way, and then by removing the studs 87, the brake drum 7 may be removed to the outside, allowing access to the brakes, which latter is a novel feature of this design.

It will be understood that the propeller shaft housing 47, has a drive fit in the bracket 45 as indicated at 83 in Figure 2, and it has a sliding fit in the inner joint member 72, as indicated at 84, in Figure 3. The housing 47 has also a drive fit in the sleeve or extension 85 as indicated at 86 in Figure 3.

It will also be seen that the motor casing 78 is unsupported except for its connection to the extension 75, so that the universal joint member 69 serves as the fulcrum or sole support for the electric motor and its adjuncts.

Having thus described my invention what I claim as new and desire to secure by Letters Patent, is:—

1. In a device of the character stated, the combination of a motor, a motor casing, a supporting structure, a train of gearing, connections common to said motor and gearing and a universal joint surrounding said structure and positioned between said motor casing and gearing and serving as a support for said connections and motor, whereby the latter is adapted to counterbalance the gearing and its adjuncts.

2. In a device of the character stated, the combination of a motor, a motor casing, a supporting structure, a train of gearing, a universal joint surrounding said structure and positioned between said motor and gearing, connections common to said motor and gearing, and passing through the members of said universal joint, and means for connecting said motor casing to a member of said joint, whereby said motor and its casing serves to counterbalance the gearing and its adjuncts.

3. In a device of the character stated, the combination of a motor, a motor casing, a propeller shaft housing, a propeller shaft therein, a worm, a gear in mesh therewith, connections common to said motor, propeller shaft and worm, a supporting structure, and a universal joint secured to said structure and positioned intermediately of the gearing and motor and serving to support said housing and propeller shaft, said motor serving as a counter balance for the gearing and its adjuncts.

4. In a device of the character stated, the combination of a motor, a motor casing, a supporting structure, a train of gearing, connections common to said motor and gearing, a universal joint surrounding said structure and positioned between said motor casing and gearing and serving as a support for said connections and motor, whereby the latter is adapted to counterbalance the gearing and its adjuncts, and a plurality of tension devices for cushioning end thrusts upon said gearing.

5. In a device of the character stated, the combination of a motor, a motor casing, a supporting structure, a train of gearing, a universal joint surrounding said structure and positioned between said motor and gearing, connections common to said motor and gearing, and passing through the members of said universal joint, means for connecting said motor casing to a member of said joint, whereby said motor and its casing serves to counterbalance the gearing and its adjuncts, a plurality of cushioning devices for cushioning end thrusts upon said gearing and removable devices for giving access to said cushioning devices.

6. In a device of the character stated, the combination of a motor, a motor casing, a propeller shaft housing, a propeller shaft therein, a worm, a gear, in mesh therewith, connections common to said motor, propeller shaft and worm, a supporting structure, a universal joint secured to said structure, and positioned intermediately of the gearing and motor and serving to support said housing and propeller shaft, said motor serving as a counterbalance for the gearing and its adjuncts, and a plurality of concentrically arranged springs for cushioning end thrusts of said worm.

7. In a device of the character stated, the combination of a motor casing, a motor shaft, a propeller shaft splined to said motor shaft, a worm, a gear meshing therewith, a worm shaft splined to said propeller shaft, a supporting structure, a universal joint secured to the latter, and a propeller shaft housing having a sliding fit in one of said joint members and a tight fit in the other joint member, said universal joint being positioned intermediately of the gearing and motor casing, and serving as a support for the latter.

8. In a device of the character stated, a motor casing, a motor therein, a shaft therefor, a supporting structure, a universal joint composed of an outer divided member secured to said structure, a plurality of oppositely disposed inner joint members, one of the latter being secured to said motor casing, a tension device for holding said inner members apart and contiguous to said outer members, and a propeller shaft housing positioned within said inner joint members.

9. In a device of the character stated, a motor casing, a motor therein, a shaft therefor, a supporting structure, a universal joint composed of an outer divided member secured to said structure, a plurality of oppositely disposed inner joint members, one of the latter being secured to said motor casing, a tension device for holding said inner members apart and contiguous to said outer members and a propeller shaft housing positioned within said inner joint members, and having a sliding fit in one of said inner members and a tight fit in the other inner member.

10. In a device of the character stated, a universal joint composed of a pair of outer divided hemispherical members having curved inner walls, a pair of inner members mounted within said outer member, juxtaposed sleeves on said inner members and a spring surrounding said sleeves and exerting outward pressure on said inner members, in combination with a shaft housing having a sliding fit in one of said sleeves and a tight fit in the other sleeve.

11. In a device of the character stated, a motor casing including its complemental shaft, a supporting structure, a universal joint comprised of an outer element secured to said structure and inner cushioned propeller shaft supporting elements one of which is secured to said motor casing, a propeller shaft an end of which is received in said cushioned parts in alignment with the motor shaft and means including a slip-joint connecting said propeller and motor shafts to permit independent longitudinal movement thereof.

12. In a device of the character stated, a motor casing including its complemental motor and shaft, a supporting structure, a universal joint comprised of a separable, outer casing secured to said structure and inner cushioned propeller shaft supporting elements, one of which is fixed to said motor casing, a propeller shaft an end of which is received in said cushioned parts in alignment with the motor shaft and means including a male and female splined portion connecting said propeller and motor shafts to permit independent longitudinal movements thereof.

13. In a device of the character stated, a chassis frame, a motor, a shaft therefor, a universal joint, supported by said frame and having one of its members connected to said motor casing, a propeller shaft, a worm, a worm shaft, a male and female spline connecting the ends of said propeller shaft to said worm shaft respectively and a gear in mesh with said worm, in combination with a spring positioned around the end of said worm shaft and within said universal joint for cushioning end thrusts thereof.

14. In a device of the character stated, a chassis frame, a motor, a shaft therefor, a universal joint, supported by said frame and having one of its members connected to said motor casing, a propeller shaft, a worm, a worm shaft, a male and female spline connecting the ends of said propeller shaft to said worm shaft respectively and a gear in mesh with said worm, in combination with a ball bearing for the end of said worm shaft, and a plurality of concentric springs within said universal joint for cushioning end thrusts of said ball bearing and worm shaft.

15. In a device of the character stated, a motor, a shaft therefor, a universal joint, having one of its members connected to said motor casing, a propeller shaft, a worm, a worm shaft, a male and female spline connecting the ends of said propeller shaft to said worm shaft respectively and a gear in mesh with said worm, in combination with a ball bearing for the end of said worm shaft, a plurality of concentric springs for cushioning end thrusts of said ball bearing and worm shaft, a shell intermediate of said springs and means for retaining said springs in assembled position.

16. In a device of the character stated, a worm shaft, a worm thereon, a gear in mesh with said worm, means for rotating said worm shaft, ball bearings for the ends of said shaft, a housing for the outer end of said shaft, a plurality of concentric springs in said housing and enclosing an end of said worm shaft, for taking up end thrusts and a shell intermediate said springs.

17. In a device of the character stated, a worm shaft, a worm thereon, a gear in mesh with said worm, means for rotating said worm shaft, ball bearings for the ends of said shaft, a housing for the outer end of said shaft, a plurality of concentric springs in said housing and enclosing an end of said worm shaft, for taking up end thrusts and a shell intermediate said springs, said shell having an inturned inner flange engaging the inner end of the inner spring, in combination with a closure for said housing for retaining the outer spring in position and a nut on the end of said worm shaft for retaining and compressing the inner spring in position.

18. In a device of the character stated, a supporting structure, a universal joint carried thereby, a motor casing secured to one member of said joint, a propeller shaft housing having a tight fit in the same member of said joint, a motor shaft, a propeller shaft, a worm shaft, connections from the ends of said propeller shaft to said motor shaft and worm shaft, a bracket enclosing the inner end of said propeller shaft, said housing having a tight fit in said bracket, and a gear in mesh with said worm.

19. In a device of the character stated, a supporting structure, a universal joint carried thereby, a motor casing secured to one member of said joint, a propeller shaft housing having a tight fit in the same member of said joint, a motor shaft, a propeller shaft, a worm shaft, connections from the ends of said propeller shaft to said motor shaft and worm shaft, a bracket enclosing the inner end of said propeller shaft, said housing having a tight fit in said bracket, and a gear in mesh with said worm, in combination with cushioning devices for taking up end thrusts of said worm shaft.

20. In a device of the character stated, a fixed axle, a rotative hub, a gear element rotatable in unison with said hub, a casing encompassing said gear element and having spaced apart bearings at its lower portion, another gear element supported in said bearings below and in mesh with the first mentioned gear element, and a propeller shaft arranged in alignment with the lower gear element and connected with said lower gear element by means including a slip joint.

21. In a device of the character stated, a fixed axle, a rotative hub, a gear element rotatable in unison with said hub, a casing encompassing said gear element and supporting spaced apart ball bearings at its lower portion, cushioning devices for one of said bearings to permit end-wise movement thereof, another gear element supported in said bearings below and in mesh with the first mentioned gear element, and a propeller shaft connected with said lower gear element by means including a slip joint, said lower gear element having rotative longitudinal movement with respect to said propeller shaft and the upper gear element.

22. In a device of the character stated, the combination of a fixed axle, a rotative hub, a gear element mounted for rotation with said hub, a casing encompassing said gear element and supporting at its lower portion spaced apart bearings, a second gear element arranged in said bearings and meshing with the first mentioned gear element, a motor, a universal joint having a fixed part and a movable part, which latter is connected to the motor casing, and a propeller shaft having a bearing in said movable part, said propeller shaft having a slip joint connection at one end with said motor and a similar connection at its other end with the lowermost of said gear elements.

23. In a device of the character stated, the combination of an unsprung axle, a sprung chassis part, a gear element rotatable with respect to said axle, a motor, a gear element rotatable below and in mesh with said first mentioned gear element, a universal joint element fixed to the said chassis part and supporting another universal joint element, which latter is connected to said motor, and a propeller shaft connected to said lowermost gear element and motor by slip joint connections, said propeller shaft passing through the movable elements of said universal joint.

24. In a device of the character stated, the combination of an unsprung axle, a sprung chassis part, a gear element rotatable with respect to said axle, a motor, a gear element rotatable below and in mesh with said first mentioned gear element, a universal joint element fixed to the said chassis part, and supporting another universal joint element, which latter is connected to said motor, a propeller shaft connected to said lowermost gear element and motor by slip joint connections, said propeller shaft having a bearing in the movable elements of said universal joint, and a housing connecting the motor casing with a part adjacent said axle, incapable of longitudinal movement but capable of movement in a vertical plane with respect to said axle, in which housing the propeller shaft is mounted, said housing serving as a torque and tie-rod.

25. In a device of the character stated, an axle, a hub member rotatably mounted thereon, a traction wheel carried by said hub member, an upper gear element fast on said hub member, a lower gear element in mesh with the upper gear element the axis of the lower gear being arranged at right angles to the axis of the upper gear, a casing surrounding said upper and lower gear elements, and oppositely located fulcrum points for the brake elements positioned in said casing, in combination with removable fastening devices on the outer end of said axle, for enabling said hub member and its adjuncts to be removed as a unit from the outer end of said axle.

JACOB H. SCHURCH.